May 3, 1960 L. A. DURANT 2,935,325

RECORD TRANSFER MECHANISM

Filed June 19, 1957 3 Sheets-Sheet 1

INVENTOR.
LYNDON A. DURANT
BY
Lloyd J Andrews

May 3, 1960 L. A. DURANT 2,935,325

RECORD TRANSFER MECHANISM

Filed June 19, 1957 3 Sheets-Sheet 2

INVENTOR.
LYNDON A. DURANT
BY

May 3, 1960 L. A. DURANT 2,935,325

RECORD TRANSFER MECHANISM

Filed June 19, 1957 3 Sheets-Sheet 3

INVENTOR.
LYNDON A. DURANT
BY
Lloyd J. Andrews

United States Patent Office 2,935,325
Patented May 3, 1960

2,935,325

RECORD TRANSFER MECHANISM

Lyndon A. Durant, Chicago, Ill., assignor to United Music Corporation, Chicago, Ill., a corporation of Illinois Application June 19, 1957, Serial No. 666,520

5 Claims. (Cl. 274—10)

This invention relates in general to automatic record players and more particularly to a record transfer means for transporting disc records from opposite sides of a magazine to a centrally positioned turntable for playing. Record transfer mechanisms prior to this invention utilizing opposite disposed arms for moving a selected record from a magazine to a turntable employed one of said arms for the forward movement of the record and the other of said arms for the return movement of the record. Thus the record was not supported from opposite edges during its transfer and hence liable to disarrangement and damage during the transfer cycle.

The present invention overcomes this difficulty and disadvantage by the provision of a pair of arms driven by a single shaft whereby the arms in rest position normally clear the opposite edges of the records in the magazine and when the arms are operated they effectively grip opposite edges of the record during its movement from the magazine to the turntable and subsequently release engagement from the record when positioned over the turntable which features are principal objects of the invention.

A further object of the invention is the provision of a pair of record transfer arms linked together by self acting compensating means and driven by a single shaft and movable in a predetermined path for gripping and transferring records from a magazine in a circular path and releasing same over a turntable for playing.

Another object of the invention is the provision of a pair of transfer arms for moving a record from a magazine laterally in an arcuate path to a turntable during one-half revolution of a drive shaft linked to said arms and to return the said record from the turntable after playing to its original position in the magazine during a subsequent one-half revolution of said drive shaft.

Another object of the invention is the provision of a pair of spaced guide rails for guiding opposite edges of a record during its transfer to and from a magazine and a turntable by a pair of pivoted transfer arms.

These and other objects and advantages in one embodiment of the invention are described and shown in the appended specification and drawings in which.

Figures 1, 4:
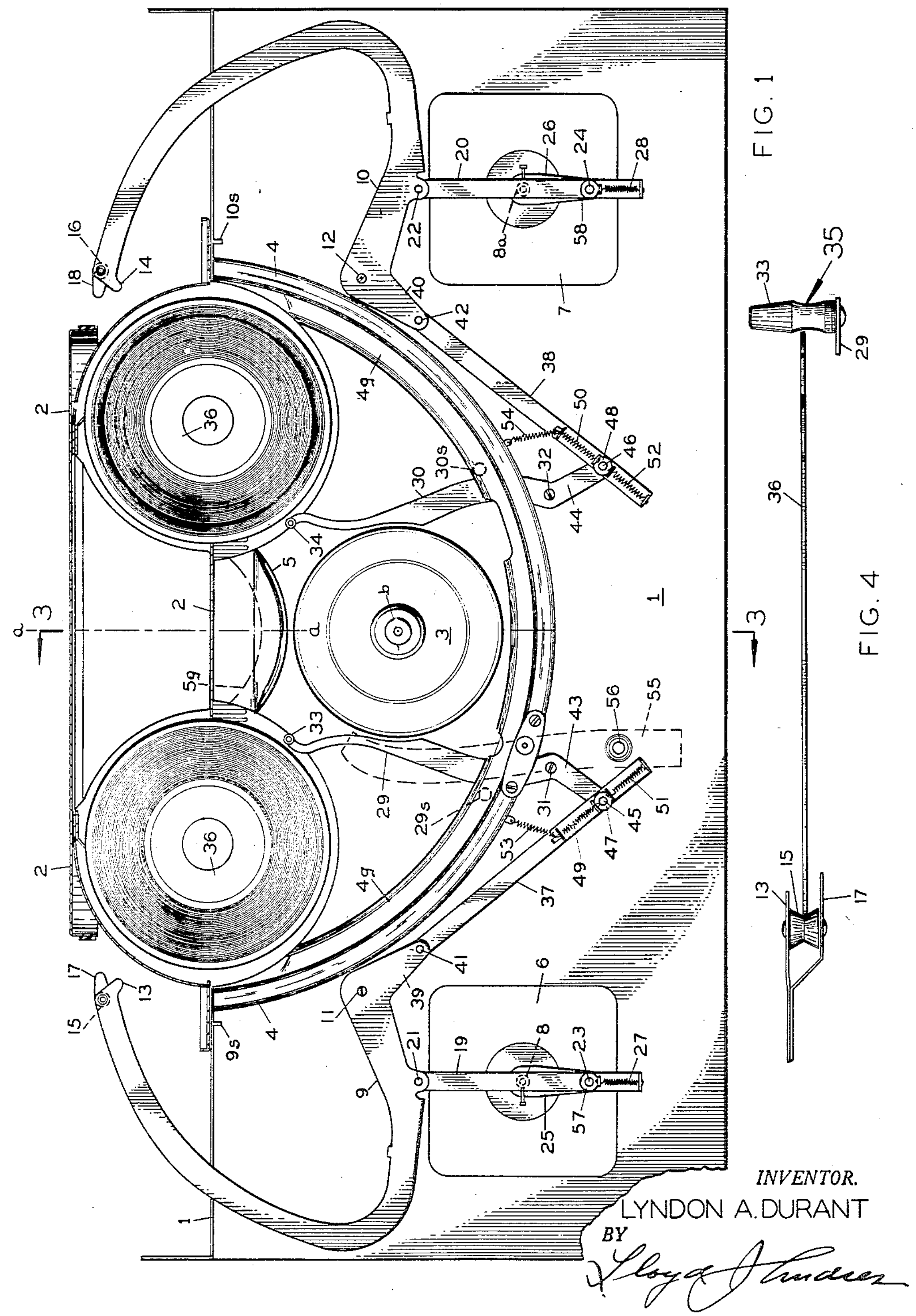
Fig. 1 is a plan view in reduced scale of the record transfer mechanism.
Fig. 4 is a fragmentary elevation of the ends of the transfer arms shown Fig. 2 engaging opposite edges of a record.
Figure 2:
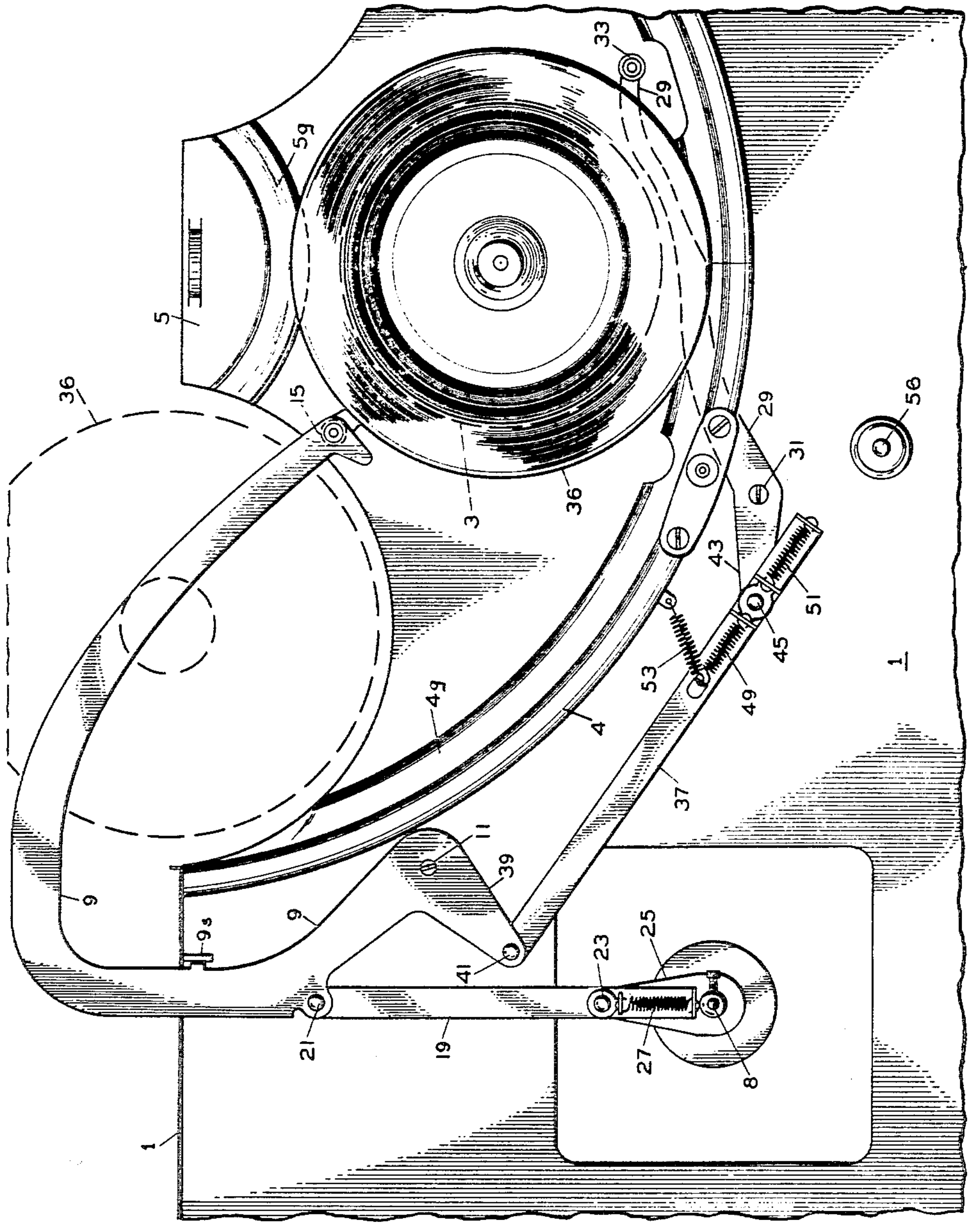
Fig. 2 is an enlarged fragmentary view of a portion of the elements in Fig. 1 in changed position.

Referring to Figs. 1 and 2, the entire mechanism is mounted on and supported by a main base or frame 1. A circular magazine assembly 2 shown in cross section is adapted to selectively rotate about axis *a—a* to each of a plurality of positions by means not shown.

A detailed description of a preferred form of magazine is shown in my pending U.S. application Serial No. 651,991. However, it is to be understood that the transfer means to be hereinafter described is also applicable to other forms of magazines.

Figures 3, 5, 6:
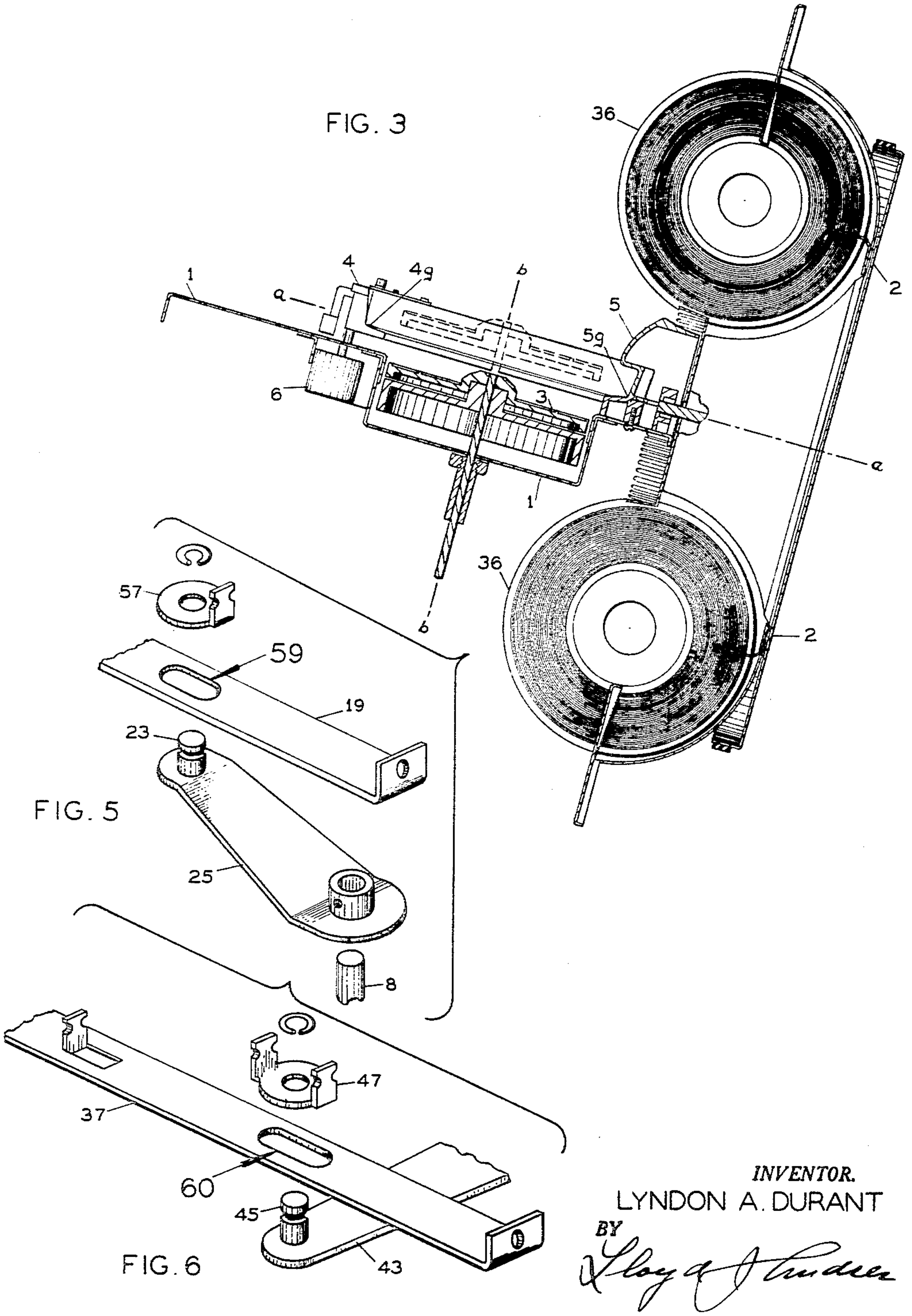
Fig. 3 is a cross sectional side elevation taken through section line 3—3, Fig. 1.
Figs. 5 and 6 are fragmentary exploded views of elements shown Fig. 2.

A retractable turntable means 3 shown Figs. 1 and 3 is centrally positioned forward of said magazine equidistant from records in opposite ends thereof as shown.

An outer arcuate guide rail 4, shown Figs. 1 and 3, is fixed to frame 1 as shown and positioned to guide the outer edge of each record on surface 4*g* during its transfer movement from the magazine to and from the turntable. An arcuate inner guide 5 is fixed to the frame for guiding the inner edge of the record on surface 5*g* during its transfer movement from the magazine to and from the turntable.

A pair of transfer gear-motors 6 and 7 are secured in frame 1 having their vertical drive shafts 8 and 8*a* projecting above the surface of the frame 1. Each said motor is also provided with a switching means, not shown, for rotating its shaft one hundred eighty degrees when momentarily energized.

Outer transfer arms 9 and 10 are pivotally mounted for oscillation about studs 11 and 12 secured in the frame 1. The outer ends of arms 9 and 10 terminate in record guide projections 13 and 14 as shown. Gripper bushings 15 and 16 are secured between the projections 13 and 14 by clevis members 17 and 18 fixed to the arms 9 and 10, respectively.

Drive links 19 and 20 are pivotally connected at one end thereof to arms 9 and 10 by studs 21 and 22 as shown. The opposite ends of links 19 and 20 are retained on studs 23 and 24 which are retained in cranks 25 and 26 secured to the drive shafts 8 and 8*a*. Springs 27 and 28 biased between the links 19 and 20 and the outer ends of crank arms 25 and 26 provide yieldable connections to be hereinafter described.

A pair of inner transfer arms 29 and 30 are pivotally secured to frame 1 by studs 31 and 32 therein. The outer ends of each arm 29 and 30 terminate in gripper posts 33 and 34 each having an annular groove 35 therein, better shown Fig. 4, for contact with the edge of the record 36. Sufficient clearance between base plate 1 and the guide rail 4 is provided to permit predetermined movement of arms 29 and 30.

Links 37 and 38 are pivotally secured to crank arms 39 and 40 of arms 9 and 10 by studs 41 and 42 respectively. The opposite ends of links 37 and 38 are yieldably secured to offset portions 43 and 44 of crank arms 29 and 30, by studs 45 and 46 fixed therein, and by retainers 47 and 48. Springs 49 and 50 are biased between retainers 47 and 48 and links 37 and 38 respectively, as shown. Counter balance springs 51 and 52 are biased between retainers 47 and 48 and the outer ends of links 37 and 38, respectively. Springs 53 and 54 are biased between links 37 and 38 and the frame 1, the action of which will hereinafter be described.

Referring to Figs. 2, 5 and 6, and to the lefthand transfer elements shown, the construction of the yieldable coupling between drive link 19 and crank arm 25 and the similar coupling between link 37 and the offset portion 43 of the transfer arm 29 are shown in the exploded views.

Drive link 19 has an elongated slot 59 therein which will permit longitudinal movement of the link on stud 23 on which retainer 57 is loosely retained by a lock ring. It is now apparent that the tension spring 27 secured in the end of link 19 and on retainer 57 will normally urge the transfer arm 9 in the position shown Fig. 1 with the gripper bushing 15 clear of the magazine.

Transfer arm 29 is coupled to link 37 as shown in exploded view Fig. 6. Link 37 has an elongated slot 60 therein in which stud 45 is engaged for movement by retainer 47. Springs 49 and 51 secured to the link 37 and the retainer 47 provide for compensating movement in two directions by the arm 29 with respect to link 37.

The transfer elements shown on the right side of Fig. 1 are the same as previously described except of opposite hand.

The dotted outline 55 in Fig. 1 illustrates a tone arm, pivoted on a rotatable vertical shaft 56 journalled in base 1, for playing engagement with a record on the turntable when the latter is raised to an upper position illustrated in dotted lines in Fig. 3.

In operation and referring to Fig. 1, it is now apparent that both sides of a given record may be played on the turntable by the sequential operation of the right and left hand record transfer elements following the half revolution of the record magazine about its axis *a—a*.

The record transfer mechanism as shown in Fig. 1 is in rest position which will permit the rotation of the record magazine for selectively positioning a predetermined record adjacent to either the left or right hand transfer mechanism with the turntable shown Fig. 3 in its lowermost position.

Assuming that a record in the left side of the magazine is registered for transfer to the turntable, the motor 6 is energized, by means not shown, and begins the rotation of crank 25 which, after predetermined movement of the stud 23 in slot 59, shown Fig. 5, will move the link 19 and begin the clockwise rotation of transfer arm 9 about stud 11 and move gripper bushing 15 into contact with the edge of the record. During this first movement of arm 9, transfer arm 29 will remain stationary due to the over center movement of stud 41 with respect to stud 11.

Continued movement of arm 9 will move the opposite edge of the record against the gripper post 33 whereby both arms 9 and 29 will move with the record to begin its transfer movement from the magazine with its edge slideably guided by the guiding surfaces *4g* and *5g* of the rails 4 and 5.

The record now gripped by the bushing 15 and post 33, as shown Fig. 4, will continue its arcuate movement to a position over the turntable 3, at which time the turntable will rise, by means not shown, along its axis *b—b* shown in dotted lines Fig. 3 and the tapered hub of the turntable will engage the center hole of the record to align the record for playing.

Substantially at the same time and just prior to the completion of the first one-half revolution of crank 25, the arm 29 will accelerate with respect to arm 9 by virtue of the inward force applied to link 37 by spring 53 resulting in relative movement of stud 45 in slot 60 and the elongation of spring 51. This action is aided by the steep angle assumed by crank arm 43 with respect to crank arm 34 which permits the post 33 to move away from the edge of the record and permit the free rise and rotation thereof by the turntable.

Just prior to the completion of the first one-half revolution of the drive crank 25 the stop *9s* will arrest the rotation of transfer arm 9 and permit stud 23 to move in slot 59 against the restraining action of spring 27. The purpose of this action is to apply accelerated motion to arm 9 at the beginning of its transfer cycle to insure a positive contact with the edge of the record.

Simultaneous with the positioning of the record over the turntable the latter will continue to rise and center the record thereon and move same into playing contact with the tone arm 55 shown in dotted lines Fig. 1.

Upon completion of the playing of a record the turntable will descend and the transfer motor will be energized and begin the second one-half revolution of the crank arm 25 by the operation of means not shown.

The drive crank 25 will rotate through a predetermined angle before imparting movement to link 19 to provide proper acceleration for the return movement of the transfer arms 9 and 29.

When the reverse movement of link 19 and the arm 9 begin, the arm 29 will accelerate and bring the post 33 into contact with the edge of the record by virtue of the relaxation of springs 53 and 51. The record now released from the turntable by the downward movement thereof, will again be gripped by the post 33 and the bushing 15, and be moved in the record guides to its original position in the magazine.

It is to be noted that the inertia in the arm 29 near the end of its return movement will overshoot the normal rest position of post 33 a predetermined distance to stop *29s* because of the yieldable coupling to link 39 and thus firmly return the record to its proper position in the magazine and then due to the action of spring 53 the arm 29 will return to its rest position with the post 33 clear of the edge of the record in the magazine. Meanwhile, arm 9 will assume its rest position shown Fig. 1 which completes the return cycle of the transfer mechanism.

The above operation also applies to the right hand transfer mechanism shown Fig. 1.

In practice, the left and right transfer mechanisms are independently and selectively operated providing means for selectively playing both sides of any records in the magazine.

Having described my invention, I claim:

1. A record transfer means for transporting disc records edgewise to and from a turntable and a magazine comprising means forming a base plate, magazine means for holding a record in a transfer zone parallel with said plate, turntable means laterally spaced from said zone adapted to receive a record for playing edgewise transported in said transfer zone to a turntable position above said turntable means, a main transfer arm pivoted for oscillation on said plate and positioned for movement in a path to and from said turntable and parallel to said plate including a gripper means at one outer end thereof for engaging the edge of a record, a second transfer arm pivoted for oscillation on said plate and positioned for movement in spaced relation to said main arm and in a path parallel said plate including a gripper means at one outer end thereof for engaging the opposite said edge of said record, a crank means journalled for rotation in said plate in a path parallel thereto, a main link having pivotal connections on each end thereof connecting said main arm and said crank means for oscillating said main arm when said crank is rotated, a record link having pivotal connections on each end thereof connecting said main arm and said second arm for oscillating the latter when said main arm is oscillated, one of said connections in each said link including a yieldable means providing predetermined relative movement between said crank means and said main arm and between the latter and the second said arm when the normal movement of said main arm and said second link is restrained, fixed stop means in said plate for restraining said main arm and spring means biased between said second link and said plate for restraining said second link whereby a record positioned in said zone by said magazine will be gripped between said arms by said gripper means and by the action of said yieldable means and transported by said arms to said turntable position and released on said turntable means by the action of said yieldable means responsive to the action of said restraining means when said crank means is rotated.

2. In a record changing mechanism of the character described a means forming a frame, a magazine means in said frame for retaining a plurality of disc records including means for presenting a selected one of said records co-planar in a transfer plane, a turntable means in said frame positioned adjacent said magazine adapted to move from a position below to a position above said plane for receiving a record transferred to a playing zone co-axial therewith and raising said record to a position above said plane for playing and visa versa when operated, an inner and an outer transfer arm independently pivoted on said frame for oscillation parallel said plane with one end of each said arm positioned and constructed to traverse said magazine and said zone respectively when oscillated, a record gripping means secured to the said one end of each arm in co-planar relation to each other and said plane for engaging opposite edges of said record during the transfer thereof, a link means pivotally connected at one end thereof to one said arm and the opposite end thereof connected by a yieldable pivot means to the other said arm for yieldably oscillating both said arms and their respective gripping means from a rest position straddling said magazine to a play position straddling said zone and visa versa when one said arm is oscillated, said yieldable pivot means including two urging elements secured to said link and the said other arm in opposite urging self-centering relation constructed to permit predetermined yieldable movement of said link means in opposite directions with respect to said other arm and positioned to normally urge both said arms toward each other to grip a said record by the opposite edges thereof between said gripping means when said link is unrestrained for gripping said record and transferring same in said plane, a yieldable restraining means biased between said frame and said link means positioned to alternately restrain each opposite linear movement of the latter and to alternately move each of said arms divergent from the other against the restraining action of said yieldable means corresponding to said rest and said play positions respectively for releasing said record from said gripping means in said magazine and in said zone when transferred thereto by said arms when one of the latter is oscillated, a crank means in said frame connected to one said arm for oscillating both said arms from said rest to said play positions when intermittently rotated whereby a record in said magazine selectively positioned thereby in said plane will be gripped between said gripping means and transferred by said arms to said zone and released therein for playing by said turntable means when same is operated and re-gripped, return transferred and released in its original position in said magazine when said crank means is intermittently rotated.

3. The construction recited in claim 2 including a pair of parallel spaced arcuate guide rails secured and positioned in said frame substantially co-planar with said transfer plane between said magazine and said playing zone constructed to guide said record by opposite edges thereof when transferred between said magazine and said zone.

4. In a record transfer mechanism for transferring a disc record edgewise in an arcuate path from a storage position to a playing zone and visa versa a means forming a frame, an inner and an outer transfer arm pivoted on said frame for independent oscillation parallel said arcuate path with one end of each said arm positioned and constructed to traverse said storage position and said zone respectively when oscillated, a record gripping means secured to the said one end of each said arm in co-planar relation for engaging opposite edges of a said record during the transfer thereof, a link means pivotally connected at one end thereof to one said arm and the opposite end thereof connected by a yieldable pivot means to the other said arm for yieldably oscillating both said arms and their respective gripping means from a rest position straddling said storage position to a play position straddling said zone and visa versa when one said arm is oscillated, said yieldable pivot means including two urging elements secured to said link and the said other arm in opposite urging self-centering relation constructed to permit predetermined yieldable movement of said link means in opposite directions with respect to said other arm and positioned to normally urge both said arms toward each other to grip a said record by the opposite edges thereof between said gripping means when said link is unrestrained for gripping said record and transferring same in said arcuate path, a yieldable restraining means biased between said frame and said link means positioned to alternately restrain each opposite linear movement of the latter and to alternately move each of said arms divergent from the other against the restraining action of said yieldable means corresponding to said rest and play positions respectively for releasing said record from said gripping means in said storage position and in said zone when transferred thereto by said arms when one of the latter is oscillated.

5. In a record transfer mechanism for transferring a disc record edgewise in an arcuate path from a storage zone to a playing zone and visa versa a means forming a frame, a first and a second transfer arm pivoted for oscillation in said frame about independent parallel axes normal to said path with one end of each said arm positioned and constructed to traverse said storage zone and said playing zone respectively when oscillated, a record gripping means secured to the said one end of each arm in co-planar relation to each other and said path for engaging opposite edges of said record during the transfer thereof, each said arm including an operating extension having a pivot means therein in predetermined angular relation to each corresponding one of said axes and said gripping means respectively, a link member connected by each opposite end thereof to each of said pivot means for oscillating both said arms and their respective gripping means from a position straddling said storage zone to a position straddling said playing zone for transferring said record to and from said zones in said path when said first arm is oscillated, each said arm and said link member dimensioned to permit predetermined relative movement of said first arm with respect to said second arm when said pivot means connecting said first arm and said link member is moved into over-center relation with the axis of said first arm for gripping and releasing said record from said gripping means in said storage zone before and after the transfer thereof to and from said playing zone when said first arm is oscillated.

References Cited in the file of this patent

UNITED STATES PATENTS 2,616,706 Maurer ---------------- Nov. 4, 1952

FOREIGN PATENTS 394,493 Great Britain ----------- June 29, 1933